United States Patent [19]

Dykema

[11] Patent Number: 4,476,969

[45] Date of Patent: Oct. 16, 1984

[54] DYNAMIC RECOIL DAMPING MECHANISM

[76] Inventor: Owen W. Dykema, 23429 Welby Way, Canoga Park, Calif. 91307

[21] Appl. No.: 367,509

[22] Filed: Apr. 12, 1982

[51] Int. Cl.³ .......................... F16F 7/10; F41F 19/06
[52] U.S. Cl. ..................................... 188/380; 89/44 R
[58] Field of Search .................. 89/44 R; 173/162 R; 181/209; 188/378-380; 248/559; 267/136, 137

[56] References Cited

U.S. PATENT DOCUMENTS

| | | | |
|---|---|---|---|
| 989,958 | 4/1911 | Frahm | 188/380 |
| 2,685,822 | 8/1954 | Walton | 89/44 R |
| 3,145,012 | 8/1964 | Kfoury | 188/380 X |
| 3,735,952 | 5/1973 | Platus et al. | 188/380 X |
| 4,309,107 | 1/1982 | McNair et al. | 188/380 X |

FOREIGN PATENT DOCUMENTS

150641 11/1981 Japan .................................. 188/380

Primary Examiner—Duane A. Reger
Attorney, Agent, or Firm—Warren T. Jessup; Richard D. Slehofer

[57] ABSTRACT

The mechanism is used to dampen the recoil or kick-back effects of a machine, such as a machine gun, jack hammer, or the like which generates short duration, high-amplitude unidirectional forces. The mechanism includes an ancillary mass interposed between the base and the recoil mass. A relatively stiff spring is engaged at one end to the recoil mass, which is in contact with the ancillary mass at the other end, only over part of the recoil cycle. A relatively soft spring is interposed between the ancillary mass and the base and is engaged at one end to the base and may be engaged to the ancillary mass at the other end. The mechanism prevents motion of the recoil mass and reduces the maximum recoil force transmitted to the base by transferring the original short-duration, high-amplitude recoil driving force impulse first to the ancillary mass, in the form of momentum of the ancillary mass, and subsequently to the base as a longer duration, lower amplitude recoil force. A trigger latch can be used to cock into position the ancillary mass and the compressed soft spring. When the trigger is pulled, the ancillary mass is accelerated towards the stiff spring. The two are in contact during the period of the recoil driving force, with almost no net motion of the recoil mass.

8 Claims, 10 Drawing Figures

DYNAMIC RECOIL DAMPING MECHANISM

BACKGROUND OF THE INVENTION

Prior art in the area of firearms is of a single type, that of a shock absorber. Operation of a gun shock-absorbing system requires that all or part of the gun move, in response to the recoil force. That part of the gun that moves is then decelerated, as slowly as possible, by the shock-absorbing system. Normally the shock absorber is some form of a spring-damping system interposed between the gun and its supporting structure. Its function is primarily to reduce the maximum amplitude and the shock-like characteristics of the force transmitted to the supporting structure. For example, in the case of a pistol, Porter (U.S. Pat. No. 2,522,192) shows that a slider moves rearward, in response to the recoil force, and is decelerated by a spring between the slider and the butt of the pistol. In Mathiew (U.S. Pat. No. 2,731,753), a rifle moves rearward and is declerated by springs contained in the stock, which compress against the shooter's shoulder. In Nasypany (U.S. Pat. No. 4,088,057), part of the recoil force is directly transmitted, by gun motion, to the shooter's shoulder while a part is transferred to an auxiliary mass. This auxiliary mass is accelerated rearward by a portion of the gun gases and, in turn, is slowly decelerated by the spring-like action of the compressibility of a trapped gas. In Edwards (U.S. Pat. No. 4,279,091), the rearward motion of the gun compresses a spring, in the stock of the gun, which, in turn, initiates rearward motion of an auxiliary mass. The rearward motion of the auxiliary mass is then slowly decelerated by a second spring.

These inventions are all variations on the simple and well-known shock absorber. Shock absorbers have been in use with machine guns since World War II. In the application of this invention to firearms, however, it is an objective of the invention to reduce gun motion as nearly as possible to zero. With no gun motion, a simple shock absorber does not function. Thus, prior art in the area of firearms (i.e. shock absorbers) does not teach the art disclosed in this invention.

There is also related prior art in the area of vibration isolation and damping, related to various commercial applications. Some of the prior art in this area again involves the shock absorber concept. For example, Karnopp (U.S. Pat. No. 3,807,678) shows a simple spring-damping system (in which the magnitude of the damping can be controlled), used to minimize transmission of a vibration (a motion of a mass) from the mass to its supporting structure. Again the mass must be in motion for the spring-damping system to perform its function. A vibration, however, can usually be described as a sinusoidal motion, predominantly at a single frequency. The spring-mass-damping system must then be tuned, as in Karnopp, to be anti-resonant at the vibration driving frequency. As in the prior art related to firearms, a vibration damping system such as that shown by Karnopp exerts no balancing forces, in fact does not function, unless there is relative motion between the primary mass and its supporting structure. This art, therefore, also does not teach the art disclosed in this invention.

Finally, a second type of vibration isolator shown in the prior art is the so-called dynamic damper. Such a system was first analyzed by Ormondroyd and Den Hartog in 1928 (Reference 1) and applications of the dynamic damper appear in the prior art in, for example, Settles (U.S, Pat. No. 2,875,731) and in Flannelly (U.S. Pat. No. 3,322,379) in 1959 and 1967, respectively. Detailed analyses of dynamic dampers are shown in textbooks on structural vibrations, for example, in Timoshenko (Reference 2), as early as 1928. The major difference between the dynamic damper and the more common shock absorber approach to vibration isolation is that the dynamic damper reduces transmission of vibrations by reducing the vibration, or motion, of the vibration source. If there is no vibration of the primary mass, no vibration can be transmitted to its supporting structure. In a dynamic damper the forces which cause vibration are transferred to an auxiliary spring-mass system. The auxiliary mass then performs strong vibrations but, since motion of the primary mass has been virtually eliminated, little or no vibration is transmitted to the main support structure.

FIG. 1 shows a schematic of a simple dynamic damper, an example taken from Reference 2. In this example, the rotating motor is assumed to be unbalanced, and transmits a sinusoidal force to the beam (supporting structure) which supports the motor, at the frequency of rotation of the motor. In this application the auxiliary spring-mass system is tuned to the frequency of the driving force, the motor rotational speed. The auxiliary mass performs strong displacement oscillations while the motor and its supporting beam remain virtually motionless. The analysis of the system shown in FIG. 1, from Reference 2, shows that the motion of the system can be represented by two simultaneous second-order differential equations, involving two degrees of freedom. The analysis also shows that there is indeed a solution for this system in which the source of the oscillatory driving force (the motor) and its supporting structure (the beam) remain virtually motionless.

As clearly pointed out in Settles (U.S. Pat. No. 2,875,731) the dynamic damper works because the auxiliary mass moves at the same frequency as the driving force, with a phase lag of 180°, and provides an auxiliary force which is at all times of equal magnitude to, but in the opposite direction from, the driving force. Thus the driving force is at all times exactly cancelled out and there is no net force remaining to cause motion in the vibration source. However, such a dynamic damper cannot be built to provide this continuous force cancellation if the driving force-time characteristic is significantly different from sinusoidal. A fundamental characteristic of a simple spring-mass system attached to a support is a varying force on the support which is sinusoidal in character, at a single frequency. If a driving force is not sinusoidal, and therefore can be represented by the sum of a number of sinusoidal oscillations at different frequencies (a Fourier representation), then a simple spring-mass system, a dynamic damper, cannot be designed to exactly, or even approximately, cancel out the driving force at all times. A dynamic damper can be designed to cancel out vibrations at one of these frequencies, but vibrations at all other frequencies will remain.

A unidirectional, impulse-type driving force, such as is generated in firing a gun, or in the contact of a jack hammer or sand tamper tool with the ground, is the most extreme example of this mismatch. FIGS. 2 and 3 show example force-time traces of a dynamic damper applied to a sinusoidal driving force (FIG. 2) and to a unidirectional, impulse-type force (FIG. 3). FIG. 2 shows the force generated by the dynamic damper at all times of equal magnitude to, and 180° out of phase from, the driving force, with the result that the net force is at all times equal to zero. FIG. 3, however, shows that the force generated by the dynamic damper can, during the period of the impulse, exactly cancel out the driving force, but at all other times the dynamic damper continues to provide a sinusoidal force which is unopposed by the driving force. Particularly because the spring-mass system of the dynamic damper provides both positive and negative forces at its attachment point, a simple spring-mass system cannot be designed to provide a force-time characteristic to match, and oppose, a driving force which is only positive (or negative).

Thus the prior art related to vibration isolation systems employing the principle of the dynamic damper do not teach methods appropriate to damping, or isolating, non-sinusoidal or impulse -type driving forces. In general, then, none of the prior art in any related field teaches the principles disclosed in this invention.

SUMMARY OF THE INVENTION

The dynamic recoil damping device finds application wherever a strong kickback or recoil effect is found when using various machines, such as a rifle, pistol, machine gun, jack hammer, sand tamper, or the like. The oft-quoted principle of physics which states that for every action there is an opposite and equal reaction is quite apparent in the recoil effects of a rifle. The recoil effect is simply a result of a sudden rapid discharge of a bullet being expelled from a rifle at a very high muzzle velocity. The recoil force against the shooter is quite sudden and shock-like. Control of the multiple recoil or kickback effects in high-caliber machine guns is an even more difficult problem.

The recoil force will always be there whenever a gun is operated. The purpose of this invention is to transfer the recoil force to an ancillary mass and soft spring which will then subsequently dissipate the force over a longer period of time.

The device consists of a soft spring, a stiff spring and an ancillary mass which are placed between a base, or gun mount, and the recoil mass itself, such as a gun. The stiff spring is attached only to the gun. The soft spring is attached to the base at one end and may be attached to the ancillary mass on its other end. The ancillary mass is much lighter than the gun mass and can be adapted to meet the specific applications. The ancillary mass/soft spring combination is "cocked" by compressing this combination against the base and using a trigger latch to keep the soft spring compressed. When the combination is released and is coordinated correctly with the discharge of the recoil mass, the soft spring will propel the ancillary mass towards the gun mass. At the instant of firing, the ancillary mass will be in contact with the stiff spring, providing a force to oppose that of the gun and prevent gun recoil. The ancillary mass will then rebound back towards the gun base. The rebound will cause the soft spring to compress again and, as a result, the ancillary mass begins reciprocating.

The face of the stiff spring which meets with the ancillary mass can have a contact plate to more effectively transfer the recoil force to the ancillary mass. Other features which can be included with the basic components to provide a more useful and practical system include means for damping the ancillary mass and soft spring to stabilize the reciprocation of the ancillary mass/soft spring combination. This damping means could be a dash pot.

A further modification could include a simple shock absorber system placed between the base or gun mount and the gun or recoil mass. The shock absorber system is placed adjacent to and in parallel with the dynamic recoil damping device. The purpose of this shock absorber system is to return the gun to the firing position between rounds if the net gun motion during firing is not exactly zero. In other words, if there does happen to be some recoil movement of the gun after it has been fired, then the shock absorber system will return the gun to its correct rest position before the next firing.

This invention could be applied to control of the shock-like forces associated with contact of the tool of a pneumatic air hammer with the ground, or the like, since short-duration, high-amplitude unidirectional forces are also encountered in this type of tool.

DETAILED DESCRIPTION OF THE PREFERRED EMBODIMENT

Figure 1:
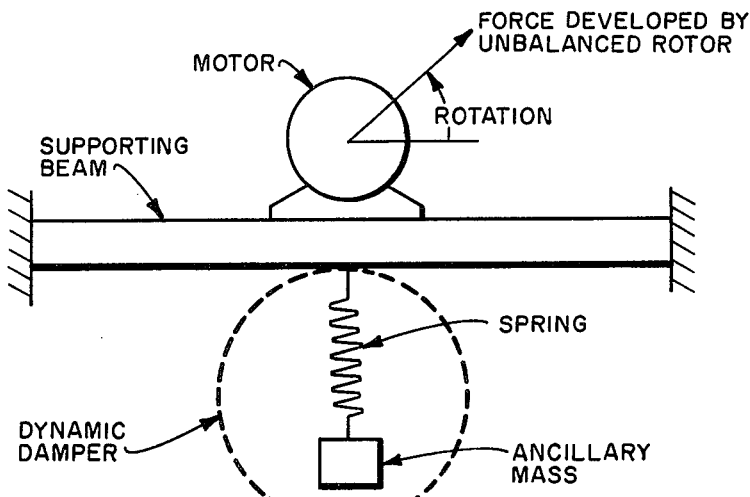
FIG. 1 is a schematic of the classical dynamic damper.
Figure 2:
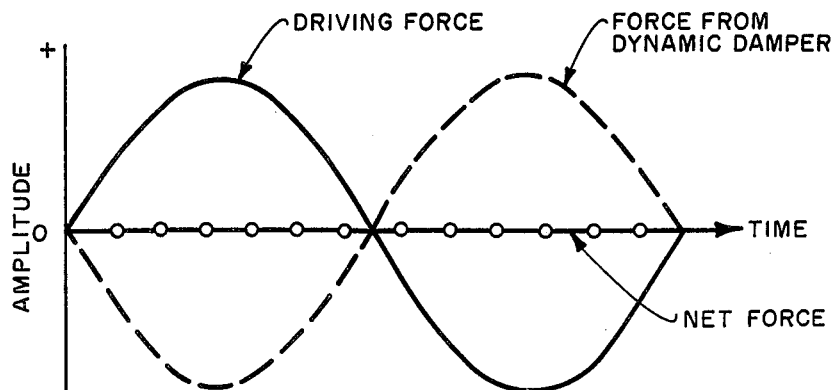
FIG. 2 is a graphic illustration showing the force-time of a dynamic damper applied to a sinusoidal driving force.
Figure 3:
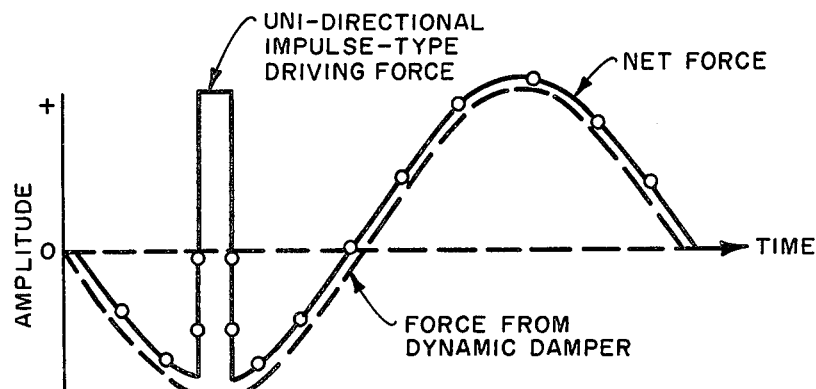
FIG. 3 is a graphic illustration of a force-time trace of a dynamic damper applied to a unidirectional, impulse-type force.

The preferred application of this invention is to devices which develop driving forces which are unidirectional (always positive or negative) and are of impulse or shock-like character (high-force amplitude over a short period of time). The specific objectives of the device of this invention are to neutralize this driving force and to minimize the magnitude and shock-like character of the force subsequently transmitted to the supporting structure. Examples of systems which develop such forces are firearms, in particular machine guns, and reciprocating industrial tools, such as jack hammers and sand tampers. Other applications will be apparent to those familiar with the art. The machine gun application will be used here as the example discussed in detail.

Since a machine gun recoil force is the result of rapid acceleration of a mass (a bullet) out of the barrel, the recoil force is of high amplitude and short duration.

Unless a mass is ejected from the gun in the direction opposite to the bullet, with equal energy, the recoil force is unidirectional, and must be opposed, in some manner, by the supporting structure.

To achieve one of the objectives of this invention, to cause the gun to "stand still" during firing, an auxiliary force must be generated which, as nearly as possible, is equal in magnitude to, and opposite in direction from, the recoil force at all times during the period of the recoil force. A recoil force can be approximately represented by a square wave, a constant force over a short period of time. It is difficult to conceive of a simple, passive auxiliary system which can develop an equal and opposite square-wave force. However, a half-cycle of a sinusoidal oscillation, wherein the period of this half-cycle is approximately equal to the recoil period, can represent an adequate opposing force for most applications. Such a half-cycle sinusoidal opposing force can be provided by an ancillary spring-mass system which is in contact with the gun only over a period approximately equal to the duration of the recoil force (see FIG. 10). With proper and controlled timing, the ancillary mass (travelling forward) can be made to contact the gun at the beginning of the gun recoil period and (now travelling rearward) to break contact with the gun at the end of this period. If the total change in momentum of the ancillary mass during this period is equal to the recoil impulse, then the gun momentum will be the same after contact, and firing, as before. If the gun was motionless prior to contact, it may perform some small motion during the interchange of forces between the gun and the ancillary mass, because of an imperfect force-time match, but will again be virtually motionless after contact is broken. In effect, the recoil force is wholly transmitted to the ancillary mass, leaving no residual, net force to cause motion of the gun. Since the recoil period is short, the frequency equivalent to the period when the ancillary mass is in contact with the gun must be very high. This means that the ratio of/the force-deflection characteristic, the spring constant, of the spring interface between the ancillary mass and the gun, while the two are in contact, to the mass of the ancillary mass must be high.

While the force interchange between the gun and the ancillary mass leaves the gun virtually motionless, the recoil energy has been transferred to the ancillary mass and soft spring. The ancillary mass, after contact with the gun, is now travelling rearward and must be decelerated. To avoid applying a strong rearward force to the gun, the ancillary mass must now have no contact with the gun. A relatively soft spring, interfacing between the ancillary mass and the gun mount, must now act on the ancillary mass, to provide the force necessary to stop, and to reverse, the rearward motion of the ancillary mass. The force exerted on the gun mount, then, is the force from this relatively soft spring. Neglecting damping, the integral of the force-time impulse applied to the ancillary mass by the gun recoil driving force, in preventing gun motion, while the ancillary mass reverses its direction of travel, must now be cancelled by an equal force-time integral applied to the ancillary mass by the soft spring in again reversing the direction of travel of the ancillary mass. Thus, the integral over time of the force exerted on the gun mount by the soft spring must be equal to the integral over time of the gun recoil force. The longer the period of time over which the ancillary mass is declerated and re-accelerated (forward) by the soft spring, the lower is the maximum force exerted on the gun mount and the less shock-like is the force-time characteristic on this structure. Thus the ratio of the force-deflection characteristic, the spring constant, of the soft spring interfacing between the ancillary mass and the gun mount to the mass of the ancillary mass should be as small as practical (the frequency as low as practical). Ideally, if the force-time characteristic against the supporting structure could be made a square-wave, then the force would be both constant in time and a minimum. In a machine gun, the maximum time over which the auxiliary mass can be decelerated and re-accelerated is limited by, and is nearly equal to, the time between rounds.

Figure 10:
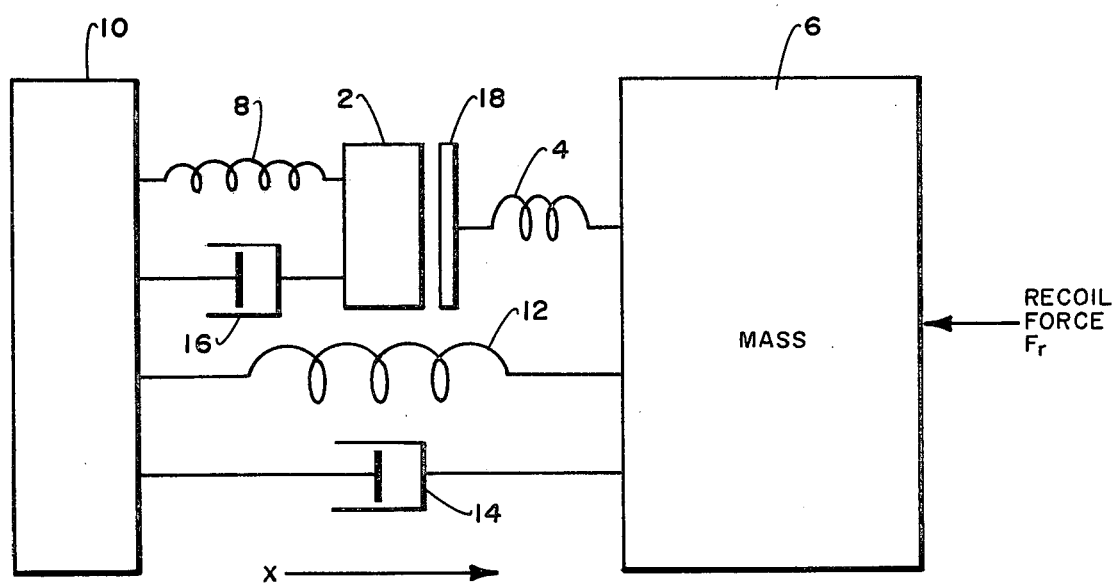
FIG. 10 is a schematic diagram showing the dynamic recoil damping device of this invention and the added feature of the shock-absorbing system.

FIG. 10 shows a schematic of the system described above, with modifications necessary for practical application of the principles of this invention. The basic embodiment of this invention is shown in FIG. 10 as the ancillary mass 2, the stiff spring 4, interfacing between the ancillary mass 2 and the recoil or gun mass 6, and the soft spring 8, interfacing between the ancillary mass 2 and the base or gun mount 10. Other features to provide a more practical system are:

1. A simple shock absorber system, shown as spring 12 and a second damper 14 (dashpot), connects the gun mass 6 directly to the gun mount 10. This is provided primarily to return the gun to the firing position between rounds in case the (small) net gun motion during firing is not exactly zero. This system also serves as a backup to protect against misfires and failure of the main recoil damping system.

2. Soft spring 8 is shown permanently attached to the ancillary mass 2. This modification simplifies the construction and operation of the recoil damping system. Since the soft spring 8 constant is much lower than that of the stiff spring 4, this permanent connection has little effect on the ancillary mass 2 dynamic behavior when in contact with the stiff spring.

3. First damper 16 (dashpot) is provided between the ancillary mass 2 and gun mount (base) 10. This is required as a trim control, as necessary, to assure exactly repeated dynamic behavior of the recoil damping system over many cycles. Ideally, no damping would be required anywhere in the system shown in FIG. 10. The modifications cited above are not strictly necessary to performance of the recoil damping device which is the subject of this invention.

FIG. 10 shows the system at rest, with no compression or tension stresses in any of the springs and no motion of any of the masses. The positive X-coordinate is in the forward direction relative to the gun, and the zero positions of the ancillary mass 2 and gun or recoil mass 6 are selected as their rest positions.

The equations of motion can be written for the ancillary and the gun masses. The result is a pair of simultaneous second-order differential equations:

$$\ddot{X}_1 + \frac{d_1}{m_1} \dot{X}_1 + \frac{k_1 + k_2}{m_1} X_1 + \frac{k_2}{m_1} X_2 = - \frac{F_r}{m_1} \quad (1)$$

$$\ddot{X}_2 + \frac{d_3}{m_2} \dot{X}_2 + \frac{k_2 + k_3}{m_2} X_2 + \frac{k_2}{m_2} X_1 = 0 \quad (2)$$

Where:
$X$ = displacement
$\dot{X}$ = velocity
$\ddot{X}$ = acceleration
$m_1$ = recoil mass 6
$m_2$ = ancillary mass 2

$k_1$ = spring constant of spring 12
$k_2$ = spring constant of stiff spring 4
$k_3$ = spring constant of soft spring 8
$d_1$ = damping constant of second damper 14
$d_3$ = damping constant of first damper 16
$F_r$ = periodic, unidirectional recoil force.

Equations (1) and (2) correctly describe the motion of masses 2 and 6 only when mass 2 is in contact, via the massless contact plate 18, with spring 4 and the gun 6 is in the process of firing. When the gun 6 is not firing, recoil force $F_r$ in equation (1) is zero and when mass 2 is not in contact with stiff spring 4, the correct equations of motion can be derived from equations (1) and (2) by setting the spring constant $k_2$ of stiff spring 4 equal to zero.

Thus, the equations describing the motion of the masses 6 (gun) and 2 (ancillary) are not only complex, simultaneous second-order differential equations, with two degrees of freedom, but they are not continuous in time. The equations of motion, therefore, were set up for numerical solution on a commuter, using an M-60 machine gun as a typical example application. Initially the gun 6 was assumed motionless in its rest position, with no forces in spring 12 or in stiff spring 4. The ancillary mass was assumed held (no velocity or acceleration) in a ready, or cocked position, away from contact with stiff spring 4, and with soft spring 8 compressed. At time zero, the ancillary mass 2 was released. At each time slice the accelerations of the two masses were calculated, from the forces being exerted on them at that time. These accelerations were then used to predict the new locations and velocities of the masses a small increment of time later. This calculation procedure was continued, resulting in full description of the time-varying displacements, velocities and accelerations of both masses and of the forces exerted on the masses and on the supporting structure. Equations (1) and (2) were changed when mass 2 was not in contact with stiff spring 4 and when the gun 6 was not firing. Variable increments of time were used in the calculation and these intervals were reduced until further reduction was seen to have negligible effect on the solution.

Figure 4:
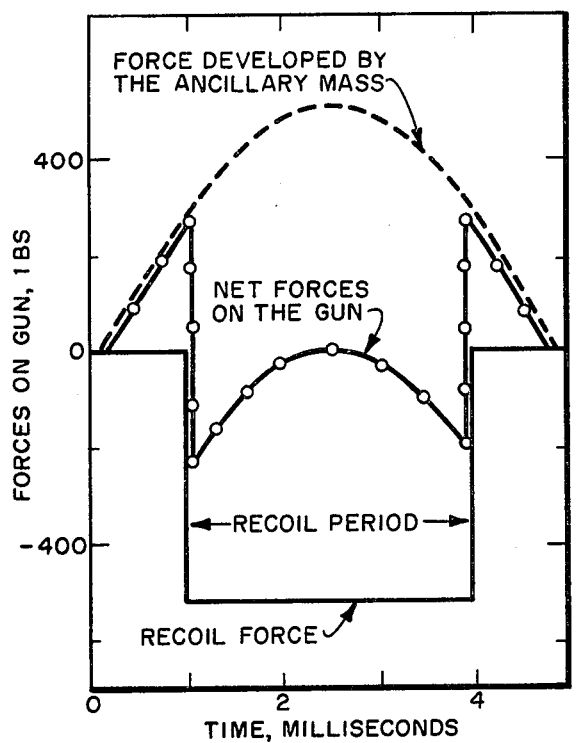
FIG. 4 is a graphic illustration showing an example of the forces on a gun during the period when the ancillary mass is in contact with the stiff spring.

FIG. 4 shows the forces on the example gun during the period when ancillary mass 2 was in contact with stiff spring 4. The figure shows build-up of a positive force on the gun 6 as the ancillary mass 2 contacts stiff spring 4 and begins to compress it. At 1.0 milliseconds the gun begins to fire. The net force on the gun becomes negative, but the decelerating ancillary mass 2 continues to build a positive force. At 2.5 milliseconds, ancillary mass 2 has reached its maximum positive displacement and the net forces on the gun are zero. Ancillary mass 2 then begins to accelerate rearward and the net negative force on the gun again begins to build. At 4.0 milliseconds, before ancillary mass 2 has broken contact with stiff spring 4, the gun recoil force is over and the net force on the gun 6 again becomes positive, decreasing to zero at 4.9 milliseconds as ancillary mass 2 breaks contact with stiff spring 4. The integral of the net force on the gun 6 over the total contact period is essentially zero and, as ancillary mass 2 breaks contact with stiff spring 4, the residual gun action is essentially zero.

Figure 5:
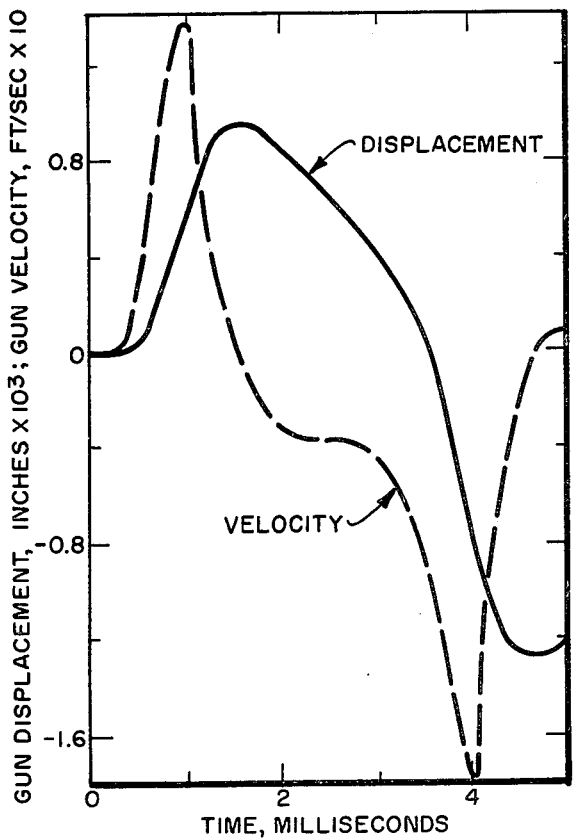
FIG. 5 is a graphic illustration showing the velocity and displacement of the example gun over the contact period of the ancillary mass.

FIG. 5 shows the velocity and displacement of the gun 6 over the contact period. The figure shows that the gun begins to move forward (positive velocity and displacement) under the driving force of the ancillary mass 2 until, at 1.0 ms, the gun begins to fire. The gun 6 then begins to move rearward, driven by the net negative force on the gun, until the gun firing period ends, at 4.0 ms. The gun 6 velocity then drops to near zero, decelerated by the force from the accelerating ancillary mass, until the ancillary mass 2 breaks contact, at 4.9 ms. In the particular case shown, total gun motion, over the entire period between rounds, is minimized by leaving the gun, at the time when the ancillary mass 4 breaks contact, with a small rearward displacement (a little over one-thousandth of an inch) and a small forward velocity (about 0.01 feet per second). The shock absorber system then most easily eases the gun into position for the next round.

Figure 6:
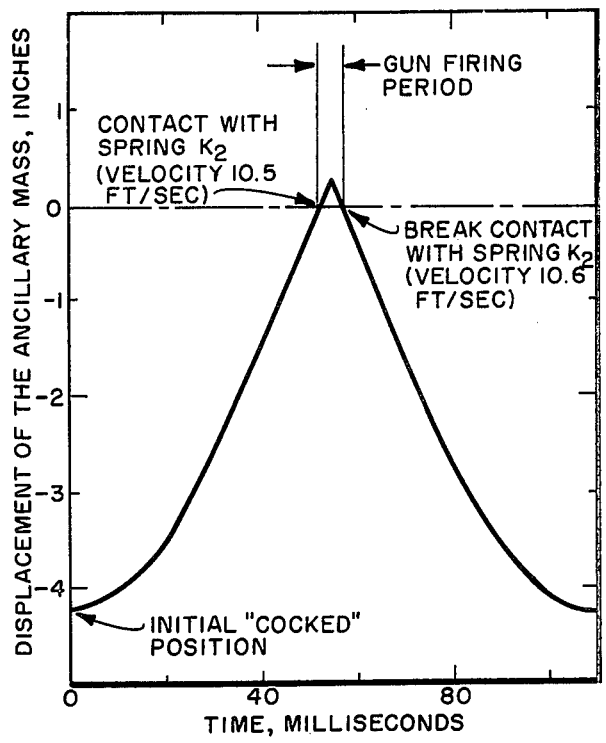
FIG. 6 is a graph showing the motion of the ancillary mass over the entire period between rounds being fired in the example gun.

FIG. 6 shows the motion of the ancillary mass 2 over the entire period between rounds. The figure shows that nearly all of the 109 ms, the period between rounds (550 rounds/minute) is occupied by the low frequency motion of the ancillary mass 2 when not in contact with the stiff spring 4. The period of time when the ancillary mass 2 is in contact with stiff spring 4 represents only about four percent of the period between rounds. It is apparent, therefore, that timing between the oscillations of the ancillary mass and gun firing is very important to proper operation of the recoil damping system. If the gun-recoil system were started by the initial round firing, the system would eventually achieve compatible timing, resulting in best performance. However, the adjustment process might require a number of rounds, during which gun motion would be excessive and loads on the gun mount high. The motion of masses described by equations of motion, such as equations (1) and (2), is so complex that often, unless the system is properly started, the desired motion will not be achieved within a practical number of cycles. For optimum system performance, therefore, it is best to start the system with the ancillary mass 2 "cocked", at the optimum rearward position, and to allow the recoil system to fire the gun, at the proper time, In this manner the system is initiated and maintained in the optimum time phasing.

Figure 7:
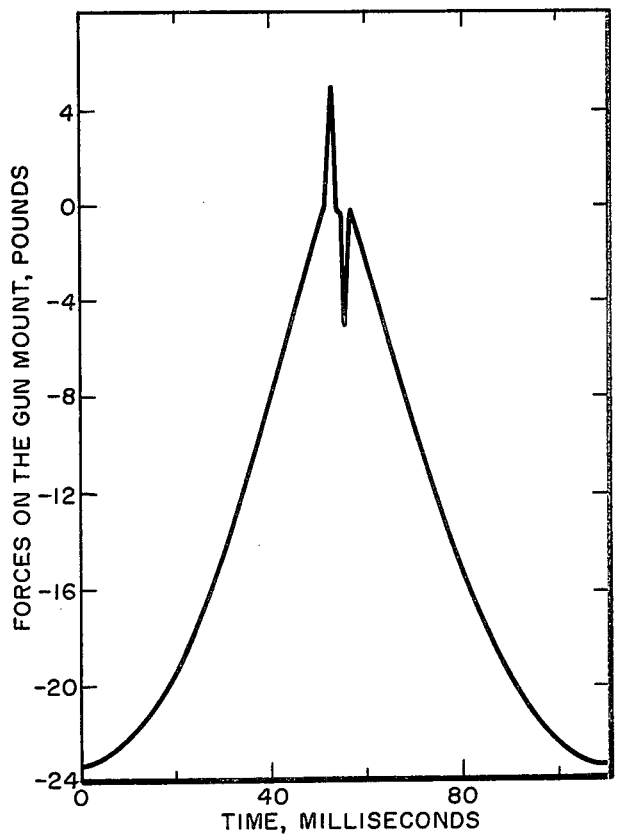
FIG. 7 is a graphic illustration showing the loads exerted on the base or gun mount of the example gun over the period of one cycle.

FIG. 7 shows the loads exerted on the gun mount over the period of the initial cycle. Time 0 begins with the gun in the cocked position. Over most of the cycle (about 96%) the forces are those transmitted from the ancillary mass, through soft spring 8, and closely follow the rearward displacement of the ancillary mass 2. The rapid fluctuations of the force from plus-to-minus five pounds in the period between 52 and 57 ms are caused by the rapid, but small, variations in gun velocity during the period of contact between the ancillary mass 2 and stiff spring 4. These are transmitted to the gun mount 10 via the second damper 14, and, if desired, could be eliminated by using variable $d_1$ damping during this time period. Since these force oscillations are small, and occur during the period when other forces on the gun mount 10 are low, they can reasonably be allowed to occur and be neglected.

FIG. 7 also shows the achievement of one of the primary objectives of this invention—an input (driving) recoil force of 518 pounds occurring over three milliseconds (a unidirectional, shock-like force) has been reduced to an approximately sinusoidal force of magnitude not greater than 23.3 pounds, spread over 109 milliseconds, for transmission to the gun mount and supporting structure. The maximum force has been reduced to less than five percent of the driving recoil force and the shock-like character of the driving force has been reduced by a factor of over thirty-six.

Figure 8:
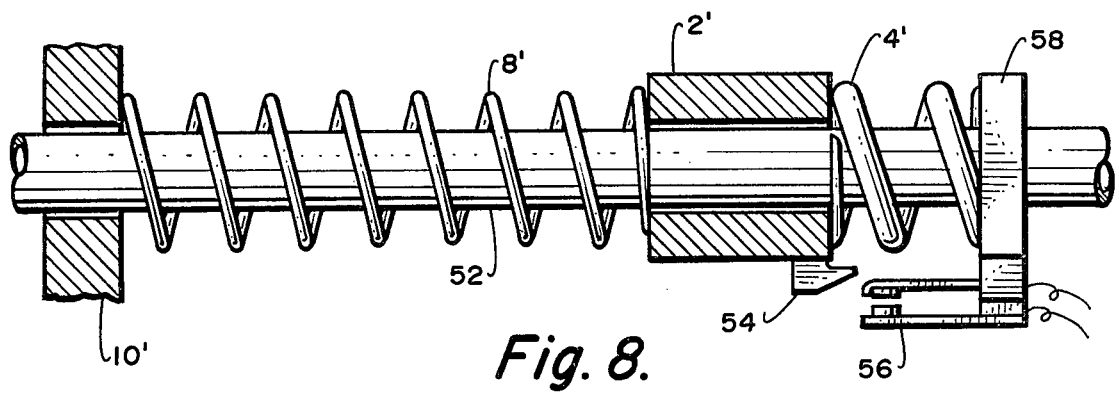
FIG. 8 is a side elevational view of a preferred embodiment of the invention and having the ancillary mass and the gun mount partly cut away. It also shows the recoil mechanism at an at-rest position.

FIG. 8 shows a preferred embodiment of the dynamic recoil damping device as applied to an M-60 machine gun and also shows the recoil system at rest with no stress or compression on either spring. In this example the dynamic recoil damping device is mounted on the barrel of the gun although this mounting scheme is not determinative of the invention. The shock absorber system is not shown in the figure.

Figure 9:
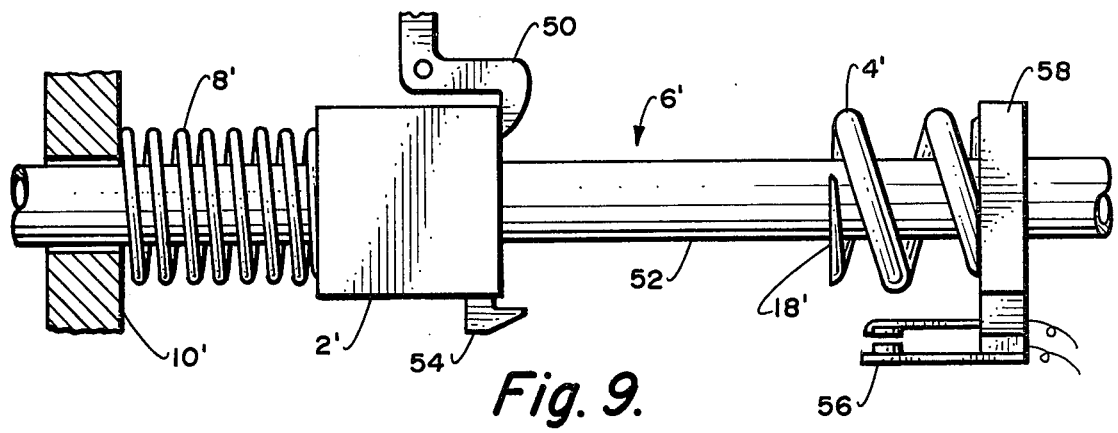
FIG. 9 is another sequence of FIG. 8, showing the recoil device in its cocked position and ready for firing.

FIG. 9 discloses the recoil system in the "cocked" position with the soft spring 8' compressed and the ancillary mass 2' held by a trigger latch 50.

In FIG. 8, the diameter of the machine gun barrel is 1.0 inches. The length of the ancillary mass 2' is 2.38 inches and the diameter of the ancillary mass is also 2.38 inches. The ancillary mass as disclosed is a cylindrical shape having a diametral hole having a diameter of 1.06 inches so that there is a slideable fit over the gun barrel 52, providing small damping. The length of the soft spring is 6.77 inches. The soft spring is permanently attached to the gun mount 10' and may be permanently attached to the ancillary mass 2', although the latter is not determinative of the invention. The stiff spring 4' is permanently attached only to the gun barrel, via flange 58. The gun barrel flange 58 has an electrical firing contact 56 attached to it. The bottom of the ancillary mass 2' has a projection 54 such that it will actuate the firing contact 56 when ancillary mass 2' reaches a specific location relative to stiff spring 4'.

The spring constants of the stiff and soft springs can be highly variable, depending upon the magnitude of the recoil driving force, the mass of the ancillary mass, the desired amount of displacement of the ancillary mass, and the time periods between rounds and of the recoil force. The ratio of the "stiff" and "soft" spring constants is approximately related to the square of the ratio of the time period between rounds and the duration of the recoil force. For a gun like the M-60, the time between rounds is about 109 milliseconds and the duration of the recoil force is about 3 milliseconds. Therefore, the "stiff" spring constant should be about 1320 times that of the "soft" spring.

In the preferred embodiment, spring constants of 2732 lb./inch and 5.514 lb./inch for the "stiff" and "soft" springs, respectively, were used for the dimensions previously recited. For a large, 30MM gun, "stiff" and "soft" spring constants of 17,100 lb. and 33.3 lb./inch, respectively, can be used. For a typical machine gun, the "stiff" spring constant will usually be 400 to 2000 times larger than that of the "soft" spring.

FIG. 9 discloses the recoil system held in a "cocked" position by means of a trigger latch 50 holding the leading edge of the ancillary mass 2'. The lip of the leading edge of the ancillary mass 2' is 4.92 inches from the face of the gun mount 10' when it is in the "cocked" position.

When the trigger latch 50 is released or actuated by suitable means, the ancillary mass 2' is accelerated forward by the decompression of the compressed soft spring 8', until the projection 54 causes the electrical contacts 56 to make contact, causing the round to be fired. At that particular point, the stiff spring 4' has been compressed slightly by the momentum of the ancillary mass 2'. Upon discharge of the round (the rifle barrel 52 and flange 58 are part of the recoil mass 6) mass 6 will very rapidly press against the face of the ancillary mass 2'. During this interval the decelerating mass 2' has compressed spring 4' and has started to rebound. The stiff spring 4' will transfer the recoil force to the mass 2', thus minimizing motion of the gun mass 6 upon discharge of the round.

The gun barrel 52 is slideable on the gun mount to allow for some recoil movement of the barrel or gun mass. The stiff spring 4' does not have a transfer plate 18', as disclosed in FIG. 10, since the face of the spring 4' is cut flat and serves the dual function of a spring and a contact plate.

As previously stated, in order to set up the coordination of the oscillation of the recoil system with the discharge of the machine gun, it is better to start the system in the "cocked" position as shown in FIG. 9. When the trigger latch 50 is released, causing the soft spring 8' to propel the ancillary mass 2' towards the stiff spring 4', the momentum of the ancillary mass 2' is such that when the bullet is discharged, the recoil force just neutralizes the reversal of momentum. As a result of this, the gun essentially remains motionless and all of the recoil force is transferred to the ancillary mass 2'. This recoil force is in turn transferred to the gun mount over the entire period between the discharge of the individual rounds. Since the period between rounds is usually thirty to forty times longer than the period of the recoil, the maximum loads transmitted to the gun mount could be reduced by as much as thirty to forty times. In addition, these loads are no longer shock-like in character.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A dynamic mechanism for reducing recoil of a recoil mass subjected to periodic, unidirectional forces and for conditioning and transmitting said forces to a mounting base comprising:

an ancillary mass interposed between said base and said recoil mass;

relatively soft spring means for reducing the recoil of said ancillary mass and having a first means for engaging said base and a second means for engaging said ancillary mass;

relatively stiff spring means interposed between said recoil mass and said ancillary mass and having a third means for engaging either said recoil mass or said ancillary mass and having a fourth means for contacting the other said mass;

means to constrain said ancillary mass to perform periodic motion along the axis of the recoil force and between said recoil mass and said base whereby movement of said recoil mass by the force means and the maximum amplitude and shock-like character of the recoil force transmitted to said base are all reduced by the dynamic action of said ancillary mass and springs.

2. The mechanism as recited in claim 1, further comprising:

a first damping means for fine tuning the oscillations of said ancillary mass and said soft spring caused by any imperfect interaction between said ancillary mass and said stiff spring.

3. The device as recited in claim 1 further comprising:

shock absorber means interposed between said base and said recoil mass for maintaining said recoil mass more accurately at an atrest position, for use in converting and transmitting the momentum of said moving ancillary mass to said base in the event of interruption of the periodic recoil force, and for use in transmitting the recoil force to said base in the event of failure of the mechanism.

4. The mechanism as recited in claim 3 wherein said shock absorber means comprises:
a spring; and
second damping means for returning said recoil mass to the rest position.

5. A dynamic mechanism for reducing recoil of a machine gun and for conditioning and transmitting recoil forces to a gun mount comprising:
an ancillary mass interposed between said gun mount and the gun;
relatively soft spring means for reducing the recoil of said ancillary mass having a first means for engaging the gun mount and a second means for engaging said ancillary mass and of equivalent stiffness such that said ancillary mass, when not in contact with the gun, will perform natural vibrations with a half-period corresponding approximately to the period between recoil forces less the period of contact of said ancillary mass with the gun;
a relatively stiff spring interposed between the gun and said ancillary mass and having a third means for engaging either the gun or said ancillary mass and having a fourth means for contacting either said ancillary mass or the gun and of equivalent stiffness such that said ancillary mass, when not in contact with the gun through said stiff spring, will perform natural vibrations with a half-period corresponding approximately to the duration of the recoil force;
means to constrain said ancillary mass to perform periodic motion on and along the axis of the gun recoil force and between the gun and said gun mount whereby movement of the gun by the recoil force and the maximum amplitude and shock-like character of the recoil force transmitted to said gun mount are all reduced by the dynamic action of said ancillary mass and springs; and
trigger means for engaging said ancillary mass and said relatively soft spring in a cocked position prior to and after gun firing.

6. The mechanism as recited in claim 5 further comprising:
electrical or mechanical means for firing a round when said ancillary mass reaches a predetermined location relative to said mass.

7. The device as recited in claim 6 further comprising:
shock absorber system means for maintaining the gun more accurately at an at-rest position between rounds, for use in converting and transmitting the momentum of said moving ancillary mass to said gun mount in the event of misfire, and for use in transmitting the recoil force to the gun mount in the event of failure of the mechanism.

8. Method for minimizing the recoil of a mass subjected to periodic, unidirectional recoil forces and for minimizing the magnitude and shock-like character of the recoil force transmitted to a base member comprising:
applying the momentum of a moving ancillary mass to said recoil mass through relatively stiff spring means over the relatively short period of time of said recoil force to neutralize said recoil force and prevent motion of said recoil mass;
containing said ancillary mass to perform periodic motion on and along the axis of said recoil force between said recoil mass and said base member; and
transmitting the subsequent momentum of said moving ancillary mass to said base member through relatively soft spring means over the relatively long period of time between the periodic forces to reduce the maximum magnitude and shock-like character of the forces transmitted to said base member.

* * * * *